United States Patent [19]

Chantelou et al.

[11] Patent Number: 4,989,089
[45] Date of Patent: Jan. 29, 1991

[54] TELEVISION PICTURE CODING DEVICE AND CORRESPONDING DECODING DEVICE, A TELEVISION PICTURE TRANSMISSION SYSTEM INCORPORATING SUCH DEVICES, AND TRANSMISSION AND RECEIVING STAGES OF SUCH A SYSTEM

[75] Inventors: Olivier Chantelou, Paris; Jean-Jacques Lhuillier, Saint-Maur, both of France

[73] Assignee: U. S. Philips Corporation, New York, N.Y.

[21] Appl. No.: 431,503

[22] Filed: Nov. 3, 1989

[30] Foreign Application Priority Data

Nov. 8, 1988 [FR] France ................... 88 14559
Mar. 3, 1989 [FR] France ................... 89 02798

[51] Int. Cl.$^5$ ............................................ H04N 7/137
[52] U.S. Cl. .................................... 358/136; 358/105
[58] Field of Search ................ 358/133, 135, 136, 105

[56] References Cited

U.S. PATENT DOCUMENTS

| | | | |
|---|---|---|---|
| 4,394,774 | 7/1983 | Widergren | 358/136 |
| 4,727,421 | 2/1988 | Koga | 358/133 |
| 4,751,587 | 6/1988 | Asahina | 358/136 |
| 4,816,906 | 3/1989 | Kummerfeldt | 358/136 |
| 4,821,119 | 4/1989 | Gharavi | 358/136 |
| 4,849,812 | 7/1989 | Borgers | 358/135 |

*Primary Examiner*—Howard W. Britton
*Attorney, Agent, or Firm*—Edward W. Goodman

[57] ABSTRACT

A television picture coding device which includes in particular a motion-estimation stage, a control circuit for controlling the motion-estimation stage, a coding stage, and a multiplexing stage, is characterized in that the original images are constituted by interlaced fields and partitioned into information blocks. The motion-estimation (110) includes displacement vectors determining circuits (201, 202, 210) and a format converting circuits (230). The controls stage (130) includes a comparator for making a comparison between a recovered non-transmitted field, to be recovered on the reception side, and an original field corresponding therewith, and a modifying circuit for modifying information components to be transmitted in case of an excessive distortion between the compared fields. A coding stage (120) is included for performing a spatial coding, and multipling stage for multiplexing the signals produced by the coding stage, the motion-estimation stage and the control stage.

12 Claims, 3 Drawing Sheets

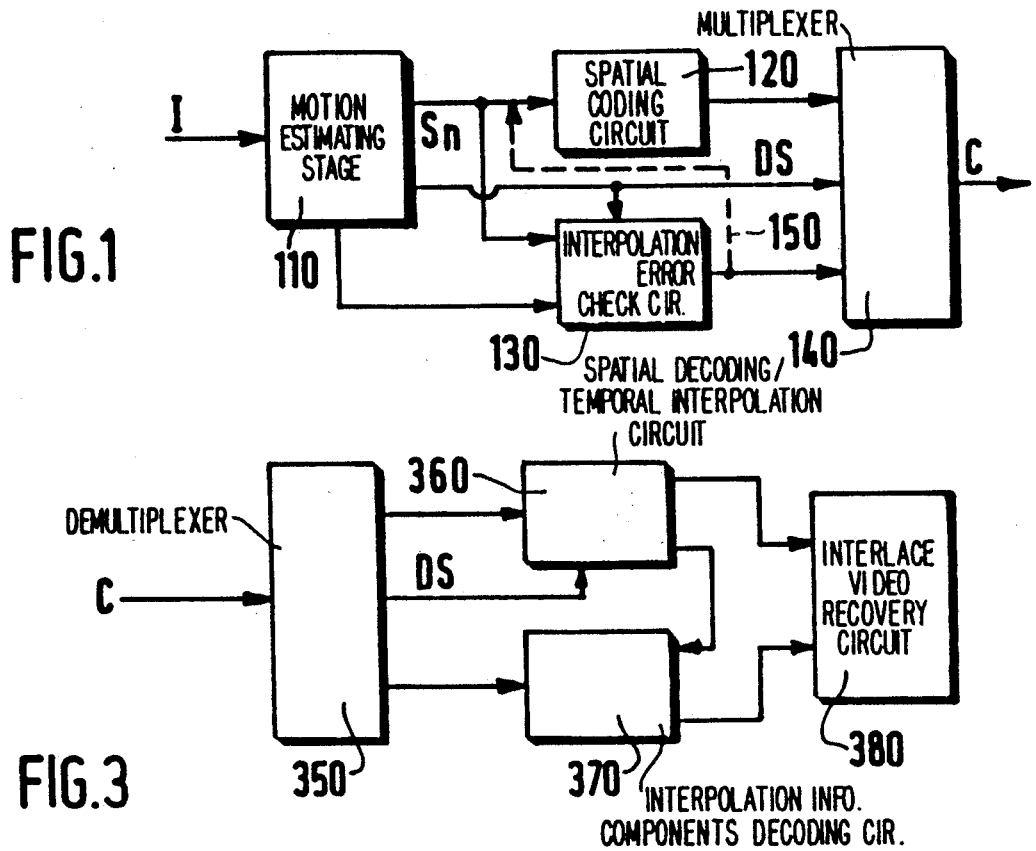
FIG.1
FIG.3
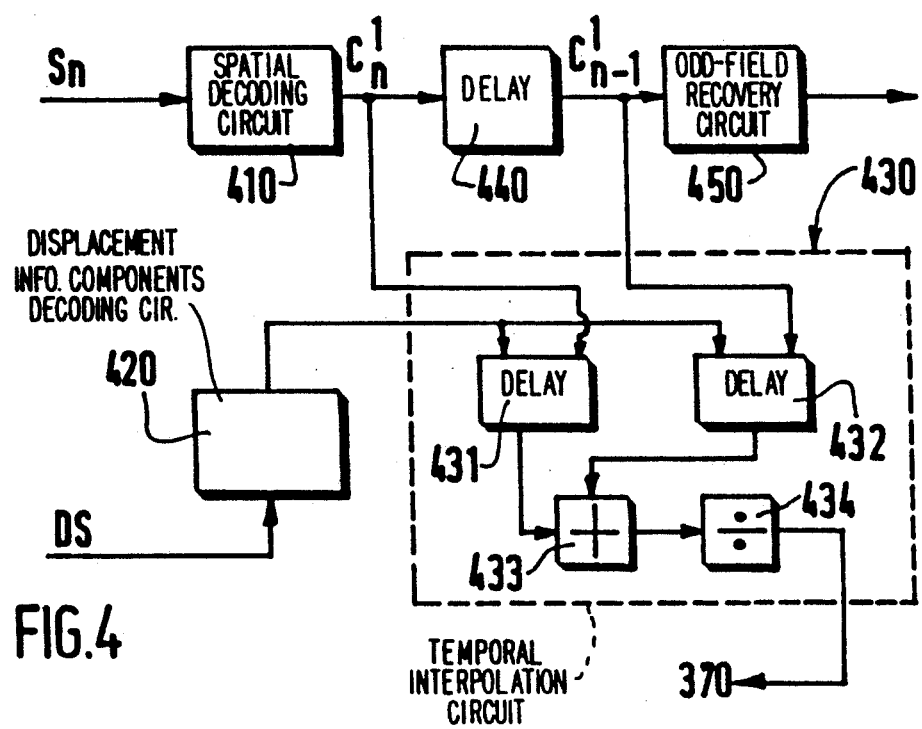
FIG.4

TELEVISION PICTURE CODING DEVICE AND CORRESPONDING DECODING DEVICE, A TELEVISION PICTURE TRANSMISSION SYSTEM INCORPORATING SUCH DEVICES, AND TRANSMISSION AND RECEIVING STAGES OF SUCH A SYSTEM

BACKGROUND OF THE INVENTION

1. Field of the Invention

The present invention relates to a television picture coding device comprising in particular:
(A) a motion estimating stage;
(B) a control circuit for controlling said motion estimation;
(C) a coding stage;
(D) a multiplexing stage. It also relates to a corresponding decoding device allowing decoding of the signals thus encoded.

The invention also relates to a system incorporating such devices and intended for the transmission of television pictures via a digital channel having a limited passband which implies a processing operation for reducing the quantity of information components to be transmitted. It finally relates to transmission and receiving stages of such a system.

The transmission or the recording of television pictures in digital form actually requires, if video signals are transmitted in the form they are in after digitizing, a passband which is eight times larger than for analog signals. Such a digital transmission via a narrow-band channel necessitates a very important reduction of the binary rate necessary for the presentation of the pictures.

2. Description of Related Art

The techniques rendering this rate reduction possible can employ the correlation present within each picture. The U.S. Pat. No. 4,394,774 discloses an example of a block-wise encoding technique, based on the discrete cosine transform, which utilizes this spatial correlation very efficiently. However, for an additional reduction of the rate, the correlation existing between pictures must be taken into account, more specifically in the still zones or in the moving zones.

Predictive techniques with motion compensation which allow the reduction of the rate up to almost 1 bit per picture element (pixel), without disturbing degradation of the quality of the decoded pictures, are also known: a loop is, for example, made operative from picture to picture, that is to say that, to transmit a block of each picture, either the block itself or the difference between this block and a block originating from the preceding encoded and decoded picture are encoded. Consequently, this technique implies that, for decoding a picture in the receiver, it is necessary to have the disposal of this encoded and decoded preceding picture.

This type of coding can therefore not be used to record picture sequences on a video recorder, in which one of the essential properties is the possibility to quickly scan the magnetic tape while displaying the pictures. Actually, this characteristic necessitates the decoding of a picture on the basis of data corresponding to this picture, and these data only, which excludes any technique in which any type of picture repetition is used.

SUMMARY OF THE INVENTION

The invention has for its object to provide a coding device which utilizes the redundancy from picture to picture to reduce the rate while rendering the quick search function on a video recorder possible, that is to say it does not use a picture-to-picture prediction loop.

To this effect, the invention relates to a device which is characterized in that, the original pictures being constituted by interlaced fields and organized into information blocks, it has the following characteristic features:

(A) the motion estimating stage comprises:
 (a) displacement vectors determining means, arranged to receive the original pictures and to supply displacement vectors associated with each one of said blocks; and
 (b) size converting means arranged to receive the pictures and said displacement vectors which are block-wise associatd with them and supplies the sequential fields in accordance with the nature of said displacement vectors;
(B) the motion estimating checking stage comprises:
 (c) comparator means for making a comparison between a recovery of non-transmitted fields to be recovered on reception and the fields of the original pictures corresponding thereto; and
 (d) modifying means for modifying, if there is excessive distortion between these compared fields, information components to be transmitted;
(C) the coding stage (120) comprises a spatial coding circuit; and
(D) the multiplexing stage is arranged to ensure the multiplexing of the output signals of the coding stage and of the motion estimating stage.

The structure thus proposed has the advantage that it takes into account the correlation from picture to picture by means of encoding one picture out of two pictures of the signal 625 lines, 50 Hz, 1:1 interlace, the missing pictures being recovered in the decoder by motion-compensated interpolation from preceding and subsequent pictures which have been transmitted. Moreover, the cosine transformation coding operation acts in this case on a non-interlaced picture, that is to say it does not have any inter-field motion. The proposed structure is consequently compatible with the "quick search with display" mode of video recorders, as it allows the decoding of an image on a working level limited to 40 ms, that is to say each picture independently from the other pictures, while maintaining a very good quality of the decoded picture.

In an advantageous embodiment, the coding device according to the invention is characterized in that the displacement vector determining means comprise two delay circuits for the synchronization of three consecutive fields, three vertical interpolation circuits, and a displacement vector determining circuit utilizing a method of block-wise correlation, and in that the size conversion means comprise intra-field or inter-field interpolation depending on the parity of the vertical component of each displacement vector determined.

Moreover, in this encoding device according to the invention, the multiplexing stage may simply comprise one multiplexer. In a preferred embodiment, said device is characterized, in that the coding stage also comprises a circuit for encoding selected displacement vectors and in that the multiplexing stage comprises a muliplexer, located before the coding stage and arranged to ensure multiplexing of the information components of the picture blocks, and a memory, located subsequent to the coding stage and arranged to ensure multiplexing of the output signals of the coding stage and of the motion estimating checking stage.

In this last-mentioned embodiment, the structure proposed is particularly advantageous in that the processing of the signals to be encoded is basically not effected in the actual encoding procedure but is effected upstream of the spatial encoding means, which can thus be used in common. This processing is consequently a kind of preprocessing, thanks to which there are inserted in the sequential fields, via a multiplexer stage of an appropriate structure, information components intended to allow correction of interpolated fields in the region of the receiver. This multiplexing operation actually suppresses any processing which would be specific for the interpolation error checking signal, without modifying the spatial encoding means relative to which the distinction between the interpolated mode and the non-interpolated mode consequently becomes, to a certain extent, transparent.

BRIEF DESCRIPTION OF THE DRAWINGS

Particulars of the invention will now become more apparent from the following description and the accompanying drawings, which are given by way of non-limitative example and in which:

FIGS. 1 and 3 show respective embodiments of a picture encoding device according to the invention and an example of the corresponding decoding device;

FIG. 4 shows a specific embodiment of the spatial decoding and temporal interpolation device of the decoding device of FIG. 3;

DESCRIPTION OF THE PREFERRED EMBODIMENT

In the embodiment shown in FIG. 1, the decoding device according to the invention includes first of all a motion estimating stage 110. This stage 110, which includes displacement vector determining means arranged to receive the original pictures and to supply displacement vectors associated with each one of the picture blocks and also size conversion means arranged to recover the orginal pictures and said vectors and to supply separate sequential fields in accordance with the nature of said vectors, is shown in a specific embodiment in FIG. 2.

The stage 110 receives as input signals interlaced 50 Hz pictures for which the following remarks should be noted:

n is an index indicating the number order the rank of an integral picture I, that is to say a picture comprising two fields and having a duration of 40 ms;

$I_n^1$ designates the first field of such a picture, of the order n;

$I_n^2$ designates the second field of this $n^{th}$ picture.

Figure 2:
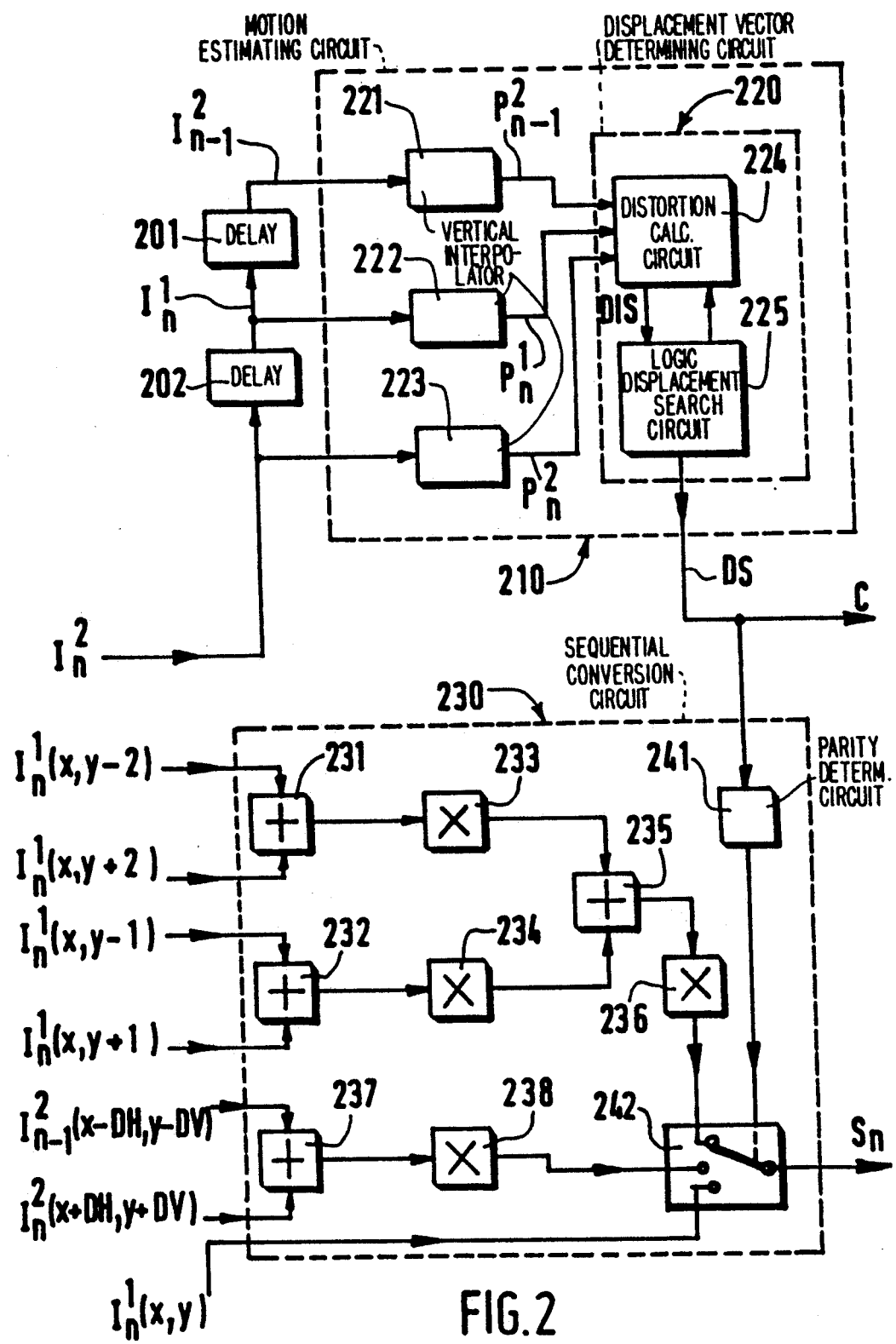
FIG. 2 shows a specific embodiment of the motion estimating stage of the encoding device of FIG. 1.

As is shown in FIG. 2, the stage 110 comprises a motion estimating circuit 210 which receives the following three fields: the current field $I_n^2$, the preceding field $I_n^1$ of the same picture of the order n, the second field $I_{n-1}^2$ of the preceding picture of the order n−1.

Delay circuits 201 and 202 which here each produce a delay of 20 ms, render it possible to delay in an appropriate manner the fields $I_n^1$ (having a duration of 20 ms) and $I_{n-1}^2$ (having a duration of 40 ms) relative to $I_n^2$, to ensure that these three fields are received in synchronism by the motion estimating circuit 210.

The estimating circuit 210 includes a displacement vector determining circuit 220 which operates in accordance with a block-by-block correlation method. This circuit 220 receives the three fields $I_{n-1}^2$, $I_n^1$, $I_n^2$ (synchronized as described in the foregoing) via three circuits 221, 222, 223 which effect vertical interpolation in the field, enabling an interlaced/sequential size conversion, that is to say in the present case to change from a 228 line size to a 576 line size. The output fields of these three circuits 221 to 223, denoted by $P^2n-1$, $P^1n$, $P^2n$, respectively, are applied to the three parallel inputs of the displacement vector determining circuit 220.

In this circuit 220 a distortion calculating circuit 224 produces a distortion value DIS (formula (1) given in the appendix) which is applied to a logic displacement search circuit 225. In the embodiment described here, the distortion associated with the vector ($V_x$, $V_y$) is consequently the sum, in the considered block, of the square of the element-to-element difference between the original field and the result of the interpolation, which is motion compensated in accordance with the vector ($V_x$, $V_y$), on the basis of the preceding and subsequent even fields.

The circuit 225 has two outputs: one output is connected to the distortion calculating circuit 224 and represents the displacement vector whose distortion DIS is to be evaluated by the circuit 224 in the subsequent stage, thus allowing a sequential search of the best displacement vector, the other output represents the displacement vector which is actually assigned to each picture block and constitutes the output, denoted DS, of the displacement vector determining circuit 220.

This displacement vector DS is then conveyed to the transmission channel C and also to a size conversion means, which in this case is a sequential conversion circuit 230. This circuit 230 also receives the fields $I_{n-1}^2$, $I_n^1$, $I_n^2$, and, on the basis of these different inputs, determines a sequential field denoted $S_n$. This field $S_n$ is structured by inserting an intermediate line between each line of the (interlaced) field $I_n^1$ to form a picture containing twice as many lines. The determination of this additional line is however different according to the parity of the vertical component DV of the selected displacement vector DS.

Actually, when the vertical component DV of the displacement corresponds to an odd value, the information components present in the fields $I_{n-1}^2$ and $I_n^2$ do not allow an improvement of the vertical resolution relative to an interpolation in the field $I_n^1$ as the information components to be used during the motion compensation will, in this case, already provide a vertical interpolation of the fields $I_{n-1}^2$ and $I_n^2$. If the component DV is, for example, odd, it is therefore sufficient to determine the picture elements of the sequential field $S_n$ by a simple interpolation in the field $I_n^1$ and not to use any other field. If, in contrast thereto, the component DV is even, the sequential conversion is obtained from the fields $I_{n-1}^2$ and $I_n^2$. Put more accurately, if the determined displacement vector DS has DH and DV as its horizontal and vertical components, the calculation of each picture element, positioned in column x of the line y, of the sequential field $S_n$ to be determined is provided by the expression (2) given in the appendix.

The sequential conversion circuit 230 then includes, in the first case, for the interpolation from only the field $I_n^1$, a filter having four coefficients, $-1/16$, 0, 9/16, 1/16, 9/16, 0, $-1/16$, applied to the field obtained, from the original field, by inserting a line of zero value between each line. This interpolating filter comprises to that end two adders 231 and 232, two multipliers 233 and 234, an adder 235, and a multiplier 236. The adder 231 effects the operation $I_n^1(x, y-2)+I_n^1(x, y+2)$, and the multiplier 233 multiplies the result of this addition by $-1$. The adder 232 effects the operation $I_n^1(x, y-1)+I_n^1(x, y+1)$ and the multiplier 234 multiplies the result of this addition by $+9$. The adder 235 adds together the outputs of these two multipliers, and the multiplier 236 multiplies the result of the latter addition by 1/16.

For the case in which DV is even, the sequential conversion circuit 230 then includes, in the example described, an adder 237 which effects the operation $I_{n-1}^2(x-DH, y-DV)+I_n^2(x+DH, y+DV)$, and also a multiplier 238 multiplying the result of this addition by $\frac{1}{2}$. The output values of these multipliers 236 and 238 are applied to a change-over switch 242 which selects one or the other of these output values in accordance with the parity of the component DV, supplied by a parity determining circuit 241 receiving the selected displacement vector DS. The output of the change-over switch 242 is the sequential field $S_n$.

The sequential field $S_n$ is then applied to a coding stage, in this case a spatial coding circuit 120, and also to a motion estimating checking stage, in the present case an interpolation error checking circuit 130, which also receives the field $I_{n-1}^2$ and the selected displacement vector DS.

The circuit 120 is a spatial coding circuit of a known type, for example of the type defined in the U.S. Pat. No. 4,394,774 mentioned already in the foregoing, and thus basically includes a scanning conversion circuit, a discrete cosine transformation calculating circuit, a quantizing circuit, a variable length-coding circuit, and a buffer memory circuit ensuring that the output rate is well-regulated.

The interpolation error checking circuit 130 is intended to verify whether the fields R, which are recovered by temporal interpolation on the receiving side, will not have excessive errors. This check is effected for each picture block: if, for a given block, the distortion between the original values I and the interpolated values R exceed a given limit value (which, in actual practice, will occur very seldom), the temporal interpolation on decoding will be inhibited by the application of an appropriate signal, and additional information components, which actually are encoded data resulting from a direct spatial coding operation identical to that mentioned in the foregoing, are thereafter transmitted via the channel to allow a correct recovery of the fields $I_{n-1}^2$ in the decoding device.

The multiplexer stage, a multiplier 140 in the case illustrated in FIG. 1, receives the output values from the circuits 110, 120 and 130, that is to say the output values which correspond to the information components to be transmitted to the decoder to allow the recovery of the video signal, and generates the signal to be transmitted, which comprises, arranged in series, the shifts of the field $I_{n-1}^2$ (originating from the circuit 110), the correction information components of the field $I_{n-1}^2$ or the additional information components (supplied by the circuit 130), and the information component resulting from decoding of $S_n$ (supplied by the circuit 120). The connecting line 150, represented by a broken line, only applies to a variant which will be examined in the sequel of this description.

The invention not only relates to a device of the type as described in the foregoing, but also to a system of transmitting television pictures via a channel of limited passband, which necessitates a processing operation for reducing the quantity of information components to be transmitted. Such a system comprises a transmission stage the coding portion of which includes a device in accordance with the embodiment described in the foregoing and also a receiving stage whose decoding portion includes a device which, compared with the preceding device, effects a processing operation which is the inverse of the recovery of high-definition pictures. The invention also relates to such transmission and receiving stages, which comprise a coding device and a decoding device of the type just mentioned, respectively.

FIG. 3 shows a preferred embodiment of the decoding device effecting this inverse processing operation, which first of all includes a demultiplexing circuit 350 for demultiplexing the information components transmitted. This demultiplexing circuit 350 is followed by a spatial decoding and temporal interpolation circuit 360 and also by an interpolation information components decoding circuit 370, and finally by a circuit 380 for recovering the interlaced video signal.

From the demultiplexing circuit 350 the circuit 370 receives the sequential output fields $S_n$ from the change-over switch 242 after having been submitted to the spatial coding effected by the circuit 120, and also the displacement vector DS which is selected for each picture block and is encoded. This stage 360, of which a specific embodiment is shown in FIG. 4, includes, on the one hand, a spatial decoding circuit 410, which receives the fields $S_n$ and supplies fields $C_n^1$ which are odd fields corresponding to the odd fields $I_n^1$, and, on the other hand a displacement information components decoding circuit 420 which receives the selected and encoded displacement vectors DS and produces decoded displacement vectors. As is also the spatial encoding, the spatial decoding is realized, in a similar manner, as disclosed in, for example, said U.S. Pat. No. 4,394,774.

A motion-compensated temporal interpolation circuit 430 receives, on the one hand, these decoded vectors, on the other hand, the output fields $C_n^1$ of the decoding circuit 410, and also the fields $C^1 n-1$ which were previously supplied by this circuit 410 and delayed by a delay circuit 440, for application to the circuit 430 in synchronism with the fields $C_n^1$. This circuit 430 comprises variable delay circuits 431 and 432, an adder 433 and a divide-by-two divider 434.

Put more accurately, the variable delay circuits 431 and 432, which receive the respective fields $C_n^1$ and $C_n^1-1$, apply to the adder 433, for each element of the field $R_{n-1}^2(x, y)$ to be recovered, the respective signals $C_n^1(x+DH, y+DV)$ and $C_n^1-1(x-DH, y-DV)$; DH and DV are, as mentioned in the foregoing, the horizontal and vertical components of the selected displacement vector DS, which, after transmission, have been decoded by the circuit 420 for the block to which the spatial coordinate point (x,y) belongs. The adder 433, which supplies the signal $C_n^1-1(x-DH,$ y−DV)+$C_n^1$(x+DH, y+DV), is followed by a divider 434 which divides this result by two, and supplies the interpolated field $R_{n-1}^2$. An odd-field recovery circuit 450 supplies the corresponding transmitted field $R_{n-1}^1$, with a delay provided to compensate for the delay introduced by the circuit 430. For the case in which the temporal interpolation has been considered as being not satisfactory by the decoding device of the circuit 130, the decoding circuit 370 replaces the interpolated block by correction data of the field $I_{n-1}^2$, which have been encoded, transmitted and decoded by the decoding circuit 370. The recovery circuit 380 for recovering the interlaced video signal receives the field $R_n^1$ on the decoding circuit 360 and the field $R_n^2$ from the decoding circuit 370 and multiplexes these data frame-by-frame in such manner as to recover an interlaced video signal constituted by odd fields $R_n^1$ and even fields $R_n^2$.

It must be understood that the present invention is not limited to the above-described and shown embodiments, from which variations can be proposed without departing from the scope of the invention. Such variations may relate more specifically to the processing of the encoded data constituting the additional information components supplied by the interpolation error checking circuit 130 and being transmitted, via the multiplexing circuit 140 and the channel, to the decoder to allow a correct recovery of the fields.

In the variation of the picture coding device shown in FIG. 1, the additional output information components from the circuit 130 are applied, for the purpose of being multiplexed, via the additional connecting line 150 shown as a broken line, no longer downstream of the spatial coding circuit 120 but upstream, via the connecting line. This modification simplifies the structure of the assembly as the totality of spatial coding means now used in common for processing either the sequential picture, in what is commonly denoted the normal mode, or the original field associated with the additional information components.

Figure 5:
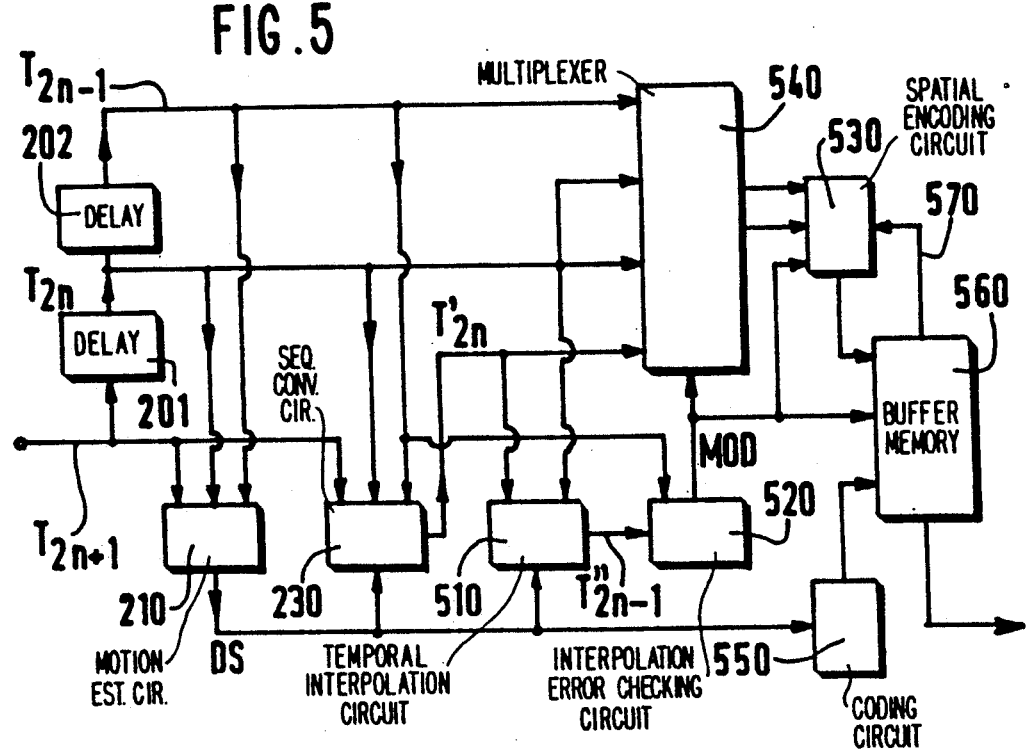
FIG. 5 shows a preferred embodiment of a motion estimating stage.

Within the scope of the variation thus proposed, the motion-estimating stage is now shown in FIG. 5. As in the preceding Figures, three consecutive frames of the-type $I_{n-1}^2$, $I_n^1$, $I_n^2$, denoted $T_{2n-1}$, $T_{2n}$, $T_{2n+2}$ here in accordance with a notation which will be obvious, are applied to the delay circuits 201 and 202, without alterations, thereafter, via these delay circuits, to the motion-estimating circuit 210. A motion vector DS is then calculated for each picture block by this estimating circuit 210 (which is identical to the previous circuit), from the said fields $T_{2n-1}$, $T_{2n}$, $T_{2n+1}$. The sequential conversion circuit 230 utilizes, as in the foregoing, the vector DS to calculate a field $T'_{2n}$ whose lines will complete the original field $T_{2n}$ (interlaced) to form the transmitted sequential picture $S_n$.

The two pictures $S_{n-1}$ and $S_n$, constituted by pairs of fields ($T_{2n-2}$, $T'_{2n-2}$ (and ($T_{2n}$, $T'_{2n}$) which appeared consecutively as indicated hereabove, are then temporally interpolated in the direction of the motion to supply a new field $T''_{2n-1}$ which spatially and temporally corresponds to the original field $T_{2n-1}$. This operation is effected by a temporal interpolation circuit 510, which in every respect is identical to the temporal interpolation circuit 430 of FIG. 4 and receives the vector DS to control the delays.

An interpolation error checking circuit 520 then evaluates the error between the interpolated field $T''_{2n-1}$ and the original field $T_{2n-1}$ and results in a measurement of the distortion which constitutes a selection criterion for the transmission mode per block. Two specific transmission modes are actually defined blockwise: an interpolated mode, a non-interpolated mode. In the first mode, a block of the picture $S_n$ (=$T_{2n}$+$T'_{2n}$), of a size of, for example, 8×8, is transmitted (that is to say, in fact, two sub-blocks belonging to the respective fields $T_{2n}$ and $T'_{2n}$). In the second mode, the lines of the block $S_n$ belonging to the field $T'_{2n}$ are not transmitted but are replaced by the lines of the preceding frame $T_{2n-1}$ which spatially correspond thereto. The two sub-blocks belonging to the fields $T_{2n}$ and $T_{2n-1}$ of different parities obviously overlap (the fields being interlaced) to form a complete block. Each block, constituted in both cases of two sub-blocks, is then spatially encoded in a spatial encoding circuit 530 of a conventional type, but it should always be noted that, for reasons of efficiency, preference is given to a separate coding of each of the two sub-blocks for the non-interpolated mode wherein the inter-field motion is not so small as to be disregarded. It will be noted that the second mode is not selected until the quality of the interpolation has proved to be insufficient, that is to say when the distortion measured across the sub-block belonging to the field $T_{2n-1}$ (as defined hereabove) is too great.

Selecting blocks or sub-blocks is effected by a multiplexer 540, which in its turn is controlled by a signal MOD supplied by the interpolation error checking circuit 520. A coding circuit 550 ensures the specific encoding of the motion vector DS. The information components generated by the spatial coding circuit 530 of the video data and by this circuit 550, as well as the interpolation mode, are then stored, before transmission, in a buffer memory 560, whose fill state retroacts on the spatial coding parameters, via the connecting line 570, to ensure a regulation of the information components rate transmitted from the output of the buffer memory 560. This buffer memory 560 also ensures multiplexing of the data to be transmitted and consequently forms together with the multiplexer 540 of the multiplexing stage in the structure shown in FIG. 5.

This structure of FIG. 5 has several advantages. For example, because of the fact that the additional information components are multiplexed upstream of the spatial coding circuit, a much greater simplicity of the structure is obtained as the spatial coding members can be used in common for processing either the sequential picture, in the interpolated mode, or the original field associated with the additional information components, in the non-interpolated mode. Moreover, in the variation thus proposed, the necessary quantity of additional information components is taken into account during the regulation of the rate ensured by the buffer store.

Figure 6:
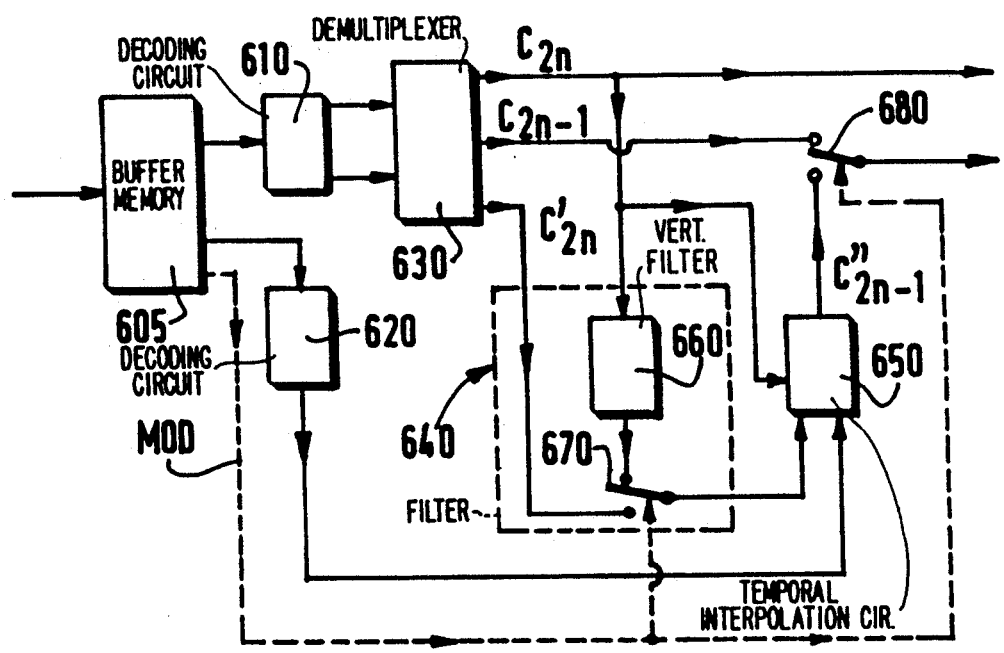
FIG. 6 then shows, in this case, an embodiment of the decoding device corresponding to a coding device provided with said preferred embodiment.

The modification introduced in the coding device within the scope of this variation results in corresponding modifications in the decoding device, shown in FIG. 6. In this Figure, the transmitted data are first received by a buffer memory 605 which also ensures the multiplexing of the received data. These data are thereafter processed in accordance with the processing operations which are the inverse of the processing operations effected during encoding. The video signals and the service information components (displacement vector DS, interpolation mode MOD) are decoded by the decoding circuits 610 and 620, respectively, by means of a demultiplexer 630 as regards the circuit 610, in such manner as to produce the fields $C_{2n-1}$, $C_{2n}$ and $C'_{2n}$.

The processing operations then differ depending on whether the mode is interpolated or not interpolated. For the non-interpolated mode, the data relative to the sub-blocks of the field $C'_{2n}$ which correspond to the field $T'_{2n}$ have not been transmitted. The sub-block is therefore recalculated by simple vertical filtering of the encoded field $C_{2n}$ which corresponds to the completely transmitted field $T_{2n}$, which filtering operation is effected by a filtering circuit 640. The samples corresponding to the picture n, that is to say to the encoded fields $C_{2n}$ and, optionally recovered field, $C'_{2n}$, are temporally interpolated to generate a field $C''_{2n-1}$ with the aid of a temporal interpolation circuit 650 which is similar to the circuit 510. For the non-interpolated mode, the sub-blocks of the field $C_{2n-1}$ (encoded field $T_{2n-1}$) have been transmitted and will therefore replace the sub-blocks of $C''_{2n-1}$ which were previously calculated in the circuit 650. The filtering circuit 640 includes a change-over switch 670 which is controlled by the service information MOD to select either directly the field $C'_{2n}$, or the field $C_{2n}$ which was filtered in a vertical filtering circuit 660, and to apply the field thus selected to the temporal interpolation circuit 650. A change-over switch 680 finally selects, under the control of the service information MOD, either the field $C_{2n-1}$, or the output field $C''_{2n-1}$ of the circuit 650, and this selected field as well as the field $C_{2n}$ are now available.

It should finally be noted, before transmission, that, when the vertical component of the displacement is odd, the field $T'_{2n}$ is calculated by simple vertical interpolation of $T_{2n}$. In this case, in the coding device, it is possible to replace in the transmission mode of a block in the picture assembled from the fields $T_{2n}$ and $T'_{2n}$ an additional transmission mode of a sub-block belonging to the field $T_{2n}$. The quantity of information to be transmitted is thus reduced, and the vertical interpolation is effected at the level of the decoding device, in the filtering circuit 640. The transmission of a service information relating to this additional transmission mode is not useful since this mode is indicated by the parity of the vertical component of the motion vector DS which vector is transmitted.

APPENDIX:
$$DIS(V_x, V_y) = \quad (1)$$

$$\sum_{bloc} [p_n^1(x,y) - \tfrac{1}{2}(p_n^2(x + V_x, y + V_y) + p_{n-1}^2(x - V_x, y - V_y))]^2$$

$$S_n(x,y) = \tfrac{1}{2}[I_{n-1}^2(x - DH, y - DV) + I_n^2(x + DH, y + DV)] \quad (2)$$

We claim:

1. A television picture coding device comprising in particular:
   (A) a motion-estimating stage;
   (B) a control stage for controlling said motion estimation;
   (C) a coding stage;
   (D) a multiplexing stage; characterized in that, the original pictures being constituted by interlaced fields and organized into information blocks, it also has the following characteristic features:
   (A) the motion-estimating stage comprises:
      (a) displacement vectors determining means, arranged to receive said original pictures and to supply displacement vectors associated with each one of said blocks; and
      (b) format converting means arranged to receive the original pictures and said displacement vectors which are block-wise associated with them and supplies the sequential fields in accordance with the nature of said displacement vectors;
   (B) the motion-estimating control stage comprises:
      (c) comparator means for making a comparison between a recovery of non-transmitted fields to be recovered on reception and the fields of the original pictures corresponding thereto; and
      (d) modifying means for modifying, if there is excessive distortion between these compared fields, information components to be transmitted;
   (C) the coding stage comprises a spatial coding circuit; and
   (D) the multiplexing stage is arranged to ensure the multiplexing of the output signals of the coding stage of the motion-estimating stage.

2. A transmitting stage for the system of transmitting television pictures via a channel of limited bandwidth requiring a processing operation for reducing the quantity of information components to be transmitted, characterized in that it includes a coding device as claimed in claim 1.

3. A system of transmitting television pictures via a channel of limited bandwidth which requires a processing operation to reduce the quantity of information components to be transmitted, comprising on either side of the transmission channel a transmission stage and a receiving stage, respectively, characterized in that said transmission stage includes a coding device as claimed in claim 1.

4. A television picture transmission system as claimed in claim 3, characterized in that the receiving stage includes a decoding device which includes a demultiplexing circuit for the information components transmitted via the transmission channel, a spatial and temporal interpolation decoding circuit receiving from said demultiplexing circuit the transmitted fields and the service information components, and a circuit for recovering the interlaced video signal.

5. A television picture transmission system as claimed in claim 4, characterized in that, in the decoding device of the receiving stage, the spatial decoding circuit includes a spatial decoding circuit receiving the fields transmitted, a displacement information components decoding circuit receiving the selected and encoded displacement vectors, a temporal interpolation circuit based on the two successively decoded fields one of which is supplied by the spatial decoding circuit and the other one by a delay circuit positioned at the output of the said decoding circuit and also the decoded displacement vectors from the output of said displacement information components decoding circuit, and a circuit for recovering the odd transmitted field, the output values of this recovery circuit of the temporal interpolation circuit being conveyed towards the circuit for recovering the interlaced video signal.

6. A coding device as claimed in claim 1, characterized in that the displacement vector determining means comprise two delay circuits for synchronizing three consecutive fields, three vertical interpolation circuits, and a displacement vector determining circuit using a method such as the block-by-block correlation method, and in that the size conversion means comprise intra-field or inter-field interpolation circuits depending on the parity of the vertical component of each displacement vector determined.

7. A coding device as claimed in one of the claims 1 and 6, characterized in that the multiplexing stage comprises a multiplexer.

8. A coding device as claimed in one of the claims 1 and 6, characterized in that the coding stage also includes a coding circuit for the selected displacement vectors and in that the multiplexing stage includes a multiplexer, positioned before the coding stage and arranged to ensure the multiplexing of information components of the picture blocks, and a memory, located subsequent to the coding stage and arranged to ensure the multiplexing of output signals of the coding stage and of the motion-estimating checking stage.

9. A device as claimed in claim 8, characterized in that, said consecutive fields being denoted $T_{2n-1}$, $T_{2n}$, $T_{2n+1}$, said device also includes:
   (a) a time interpolation circuit receiving the output field $T_{2n}$ from the first delay circuit and the output field $T'_{2n}$ from the size converter means, and the displacement vector DS from the output of the displacement vector determining circuit to supply a new field $T''_{2n-1}$ which spatially and temporally corresponds to said field $T_{2n-1}$, taking account of the direction of the motion;
   (b) an interpolation error checking circuit receiving said original field $T_{2n-1}$ and the said new interpolated field $T''_{2n-1}$ to supply a transmission mode indication signal MOD linked with the quality of the interpolation realized and intended to control a spatial coding circuit and a multiplexer;
   (c) said spatial circuit encoding the blocks or sub-blocks of the output image of said multiplexing stage;
   (d) said multiplexer receiving the original fields $T_{2n-1}$, $T_{2n}$ and the output field $T'_{2n}$ from the sequential converting circuit to be conveyed towards the said coding circuit;
   (e) a specific coding circuit for coding the displacement vector DS; and
   (f) a buffer store for storing the encoded output fields of said spatial coding circuit and of said encoded displacement vector, said buffer store having a first output at which the data to be transmitted are present, and also a second output which is fed back via a feedback line to the spatial coding circuit with a view to regulating the rate of the said data to be transmitted.

10. A transmitting stage for the system of transmitting television pictures via a channel of limited bandwidth requiring a processing operation for reducing the quantity of information components to be transmitted, characterized in that it includes a coding device as claimed in claim 9.

11. A television picture transmission system as claimed in claim 10, characterized in that the receiving stage includes a decoding device which includes a demultiplexing circuit for the information components transmitted via the transmission channel, a spatial and temporal interpolation decoding circuit receiving from said demultiplexing circuit the transmitted fields and the service information components, and a circuit for recovering the interlaced video signal.

12. A television picture transmission system as claimed in claim 11, characterized in that the decoding device includes a buffer memory for demultiplexing the transmitted information components, followed by a spatial decoding circuit for decoding the transmitted fields and a decoding circuit for decoding the service information, a demultiplexer producing fields $C_{2n-1}$, $C_{2n}$, $C'_{2n}$, a filtering circuit (640) based on the directly received field $C'_{2n}$ and the field $C_{2n}$ received via a vertical filtering circuit, and a temporal information circuit on the basis of the fields $C_{2n}$ and $C'_{2n}$, the fields available at the output of the said decoding device originating from the field $C_{2n}$, or from either the field $C_{2n-1}$ or the field $C''_{2n-1}$ from the output of the said temporal interpolation circuit, depending on the position of a change-over switch which is controlled by the information about the transmission mode.

* * * * *